US012584995B2

(12) United States Patent

Kim et al.

(10) Patent No.: US 12,584,995 B2

(45) Date of Patent: Mar. 24, 2026

(54) METHOD AND APPARATUS FOR PROCESSING RADAR SIGNAL

(71) Applicant: ELECTRONICS AND TELECOMMUNICATIONS RESEARCH INSTITUTE, Daejeon (KR)

(72) Inventors: Hyung Ju Kim, Daejeon (KR); Myung Sun Song, Daejeon (KR); Sung Jin Yoo, Daejeon (KR); Byung Jang Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 399 days.

(21) Appl. No.: 17/952,481

(22) Filed: Sep. 26, 2022

(65) Prior Publication Data

US 2023/0168339 A1 Jun. 1, 2023

(30) Foreign Application Priority Data

Nov. 30, 2021 (KR) ........................ 10-2021-0169428
Aug. 23, 2022 (KR) ........................ 10-2022-0105351

(51) Int. Cl.
*G01S 7/298* (2006.01)
(52) U.S. Cl.
CPC ..................................... *G01S 7/298* (2013.01)
(58) Field of Classification Search
CPC ....................................................... G01S 7/298
USPC ......................................................... 342/189
See application file for complete search history.

(56) References Cited

U.S. PATENT DOCUMENTS

| | | | |
|---|---|---|---|
| 9,354,310 B2 | 5/2016 | Visser et al. | |
| 10,754,005 B2 | 8/2020 | Lien et al. | |
| 10,795,009 B2 | 10/2020 | Lien et al. | |
| 10,955,547 B2 | 3/2021 | Ray | |
| 2014/0049418 A1* | 2/2014 | Feigin | G01S 13/885 |
| | | | 342/22 |

(Continued)

FOREIGN PATENT DOCUMENTS

| | | | |
|---|---|---|---|
| CN | 108983161 A | * 12/2018 | |
| CN | 112924948 A | * 6/2021 | G01S 7/41 |

(Continued)

OTHER PUBLICATIONS

Melvin et al. "Principles of Modern Radar, vol. III: Radar Applications," SciTech Publishing, ISBN 978-1-61353-032-0, 2014 (Year: 2014).*

(Continued)

*Primary Examiner* — William Kelleher
*Assistant Examiner* — Samarina Makhdoom
(74) *Attorney, Agent, or Firm* — LRK PATENT LAW FIRM

(57) ABSTRACT

An operation method of a radar signal processing apparatus in a radar system may include: generating pulse signals of a number of any one sampling rate having different phases; transmitting the pulse signals to a target; receiving reflected pulse signals reflected back from the target; generating a composite signal by sampling the reflected pulse signals and combining the sampled reflected pulse signals to match the phases; and extracting target information from the composite signal.

10 Claims, 6 Drawing Sheets

(56) References Cited

U.S. PATENT DOCUMENTS

| | | |
|---|---|---|
| 2016/0282457 A1 | 9/2016 | Mazzaro et al. |
| 2018/0203091 A1* | 7/2018 | Robinson ................ G01S 7/021 |
| 2020/0091608 A1 | 3/2020 | Alpman et al. |
| 2021/0041530 A1 | 2/2021 | Jeong et al. |
| 2021/0239790 A1 | 8/2021 | Park et al. |

FOREIGN PATENT DOCUMENTS

| | | | |
|---|---|---|---|
| EP | 2698647 A1 | 2/2014 | |
| KR | 10-2235571 B1 | 4/2021 | |
| KR | 10-2329550 B1 | 11/2021 | |
| WO | WO-2009147406 A1 * | 12/2009 | ........... G01S 13/584 |
| WO | WO-2018141879 A2 * | 8/2018 | .......... H03M 1/1245 |
| WO | 2020/161968 A1 | 8/2020 | |

OTHER PUBLICATIONS

Benedikt Schweizer et al., "Stepped-Carrier OFDM-Radar Processing Scheme to Retrieve High-Resolution Range-Velocity Profile at Low Sampling Rate", IEEE Transactions on Microwave Theory and Techniques, vol. 66, No. 3, Mar. 2018.
Young-Jae Yoo et al., "ETS Sampler design for borehole radar receiver using 4 different clock phases", Journal of the Korea Academia-Industrial cooperation Society, vol. 19, No. 1 pp. 680-687, 2018.

* cited by examiner

| radar signal generator | ~110 |
| transmitter | ~120 |
| receiver | ~130 |
| reception signal processor | ~140 |
| target information extractor | ~150 | start

| generation of radar signal | ~S210 |
| transmission of radar signal | ~S220 |
| reception of reflected signal | ~S230 |
| generation of composite signal | ~S240 |
| extraction of target information | ~S250 | end

FIG. 3

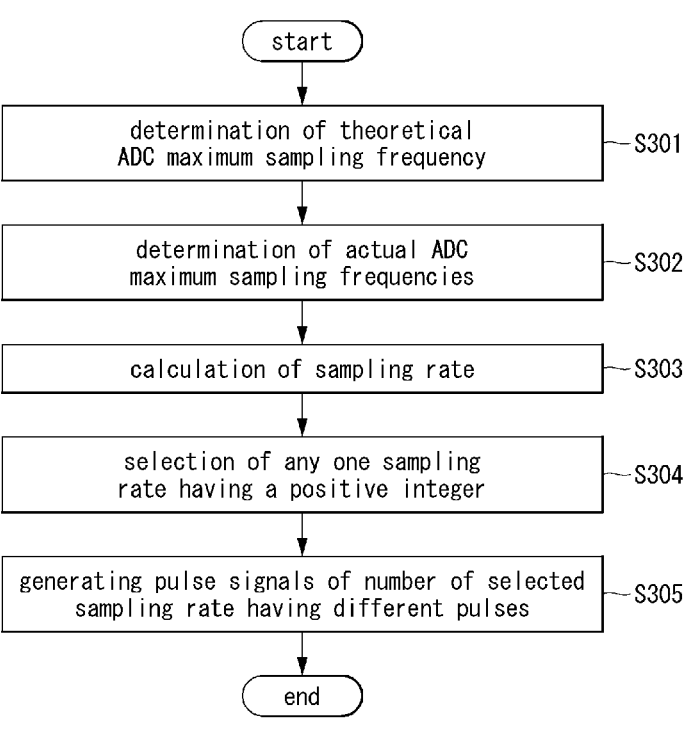

start determination of theoretical
ADC maximum sampling frequency    ─S301 determination of actual ADC
maximum sampling frequencies    ─S302 calculation of sampling rate    ─S303 selection of any one sampling
rate having a positive integer    ─S304 generating pulse signals of number of selected
sampling rate having different pulses    ─S305 end

FIG. 4

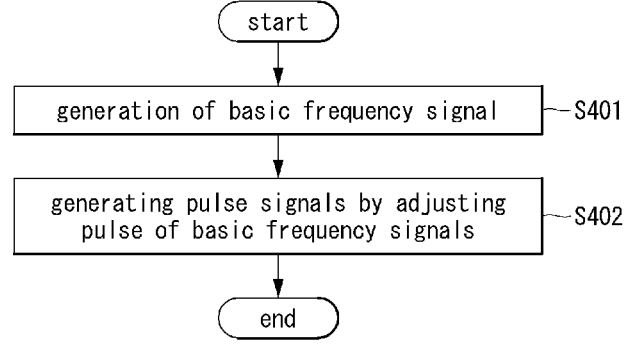

start generation of basic frequency signal    ─S401 generating pulse signals by adjusting
pulse of basic frequency signals    ─S402 end

METHOD AND APPARATUS FOR PROCESSING RADAR SIGNAL

CROSS-REFERENCE TO RELATED APPLICATIONS

This application claims priority to Korean Patent Applications No. 10-2021-0169428, filed on Nov. 30, 2021, and No. 10-2022-0105351, filed on Aug. 23, 2022, with the Korean Intellectual Property Office (KIPO), the entire contents of which are hereby incorporated by reference.

BACKGROUND

1. Technical Field

The present disclosure relates to a radar signal processing technology, and more particularly, to a radar signal processing technology capable of detecting information about a target by receiving reflected signals of transmitted signals by sequentially adjusting the phases of frequency components.

2. Description of Related Art

A radar signal processing apparatus may be an apparatus for transmitting a radar signal through a transmission antenna, and then receiving a reflection signal reflected from an object in a corresponding area through a reception antenna, thereby detecting target information such as a distance to a target, a moving speed of a target. As such a radar signal processing apparatus, there is a frequency modulated continuous wave (FMCW) radar, which is a pulse scheme radar, may be typically used to detect distance information to a target and speed information of a target. When using multiple array antennas and multiple-input and multiple-input (MIMO) radar technology, not only distance information, but also azimuth and elevation information can be obtained. Such a radar signal processing apparatus may not only transmit various types of electromagnetic wave signals according to the purpose of use, but may also be operated in accordance with each purpose of use by incorporating various technologies.

The radar signal processing apparatus may need to convert an analog electromagnetic wave signal into a digital signal for digital radar signal processing. To this end, the radar signal processing apparatus may include an analog-to-digital converter (ADC). With respect to these ADCs, some radar processing apparatuses may require an ADC that covers the radar's bandwidth. In addition, some radar systems for securing distance resolution may require a high specification ADC more, and some ultra-wideband (UWB) scheme radars may require a high specification ADC that exceeds tens of times or more of the bandwidth to achieve precise millimeter range accuracy.

SUMMARY

In order to achieve the above problem, an object of the present disclosure is to provide a radar signal processing method and apparatus capable of detecting information about a target by receiving reflected signals of transmitted signals by sequentially adjusting the phases of frequency components.

According to a first exemplary embodiment of the present disclosure for achieving the above-described objective, an operation method of a radar signal processing apparatus in a radar system may comprise the steps of: generating pulse signals of a number of any one sampling rate having different phases; transmitting the pulse signals to a target; receiving reflected pulse signals reflected back from the target; generating a composite signal by sampling the reflected pulse signals and combining the sampled reflected pulse signals to match the phases; and extracting target information from the composite signal.

The step of generating pulse signals of a number of any one sampling rate having different phases may include the steps of: determining a theoretical maximum sampling frequency; selecting actual maximum sampling frequencies that are smaller than the theoretical maximum sampling frequency; calculating sampling rates that are ratios of the actual maximum sampling frequencies to the theoretical maximum sampling frequency; selecting one sampling rate having a positive integer from the calculated sampling rates; and generating the transmission pulse signals of the number of the selected sampling rate to have the different phases.

The different phases may be $t_s/\text{SR}$, where SR is the selected sampling rate, and $t_s$ is a sampling interval of the actual ADC maximum sampling frequency of the selected sampling rate.

The step of generating the transmission pulse signals of the number of the selected sampling rate to have the different phases may include the steps of: generating N number of basic frequency signals; and generating the transmission pulse signals by combining the N number of basic frequency signals while adjusting phases of the basic frequency signals, wherein N is a positive integer.

A phase, $\theta_{n,b}$, of each basic frequency signal constituting each transmission pulse signal may be $2\pi \cdot f_n/(\Delta f \cdot N) \cdot (b-1)$, where b is 1 to SR, n is an index of the basic frequency signal, $f_n$ is a frequency of the basic frequency signal, and b is an index of the transmit pulse signal, $\Delta f$ is a frequency interval of the basic frequency signal, and the SR is the selected sampling rate.

The step of generating a composite signal by sampling the reflected pulse signals and combining the sampled reflected pulse signals to match the phases may include the steps of: sampling the reflected pulse signals; delaying each phase of the sampled reflected pulse signals by a predetermined magnitude from a phase of an immediately preceding sampled reflected pulse signal; and generating the composite signal by combining the phase-delayed sampled reflected pulse signals.

The step of delaying each phase of the sampled reflected pulse signals by a predetermined magnitude from a phase of an immediately preceding sampled reflected pulse signal may include the steps of: arranging samples of a first sampled reflected pulse signal on each sampling interval grid; and arranging samples of each following sampled reflected pulse signal on each sampling interval grid delayed by an amount of time the phase is advanced in generating a corresponding pulse signal.

According to a second exemplary embodiment of the present disclosure for achieving the above-described objective, a radar signal processing apparatus may comprise: a processor; a memory in electronic communication with the processor; and instructions stored in the memory, wherein when the instructions are executed by the processor, the instructions cause the radar signal processing apparatus to: generate pulse signals of a number of any one sampling rate having different phases; transmit the pulse signals to a target; receiving reflected pulse signals reflected back from the target; generate a composite signal by sampling the reflected pulse signals and combining the sampled reflected pulse signals to match the phases; and extract target information from the composite signal.

When generating pulse signals of a number of any one sampling rate having different phases, the instructions may cause the radar signal processing apparatus to: determine a theoretical maximum sampling frequency; select actual maximum sampling frequencies that are smaller than the theoretical maximum sampling frequency; calculate sampling rates that are ratios of the actual maximum sampling frequencies to the theoretical maximum sampling frequency; select one sampling rate having a positive integer from the calculated sampling rates; and generate the transmission pulse signals of the number of the selected sampling rate to have the different phases.

When generating the transmission pulse signals of the number of the selected sampling rate to have the different phases, the instructions cause the radar signal processing apparatus to: generate N number of basic frequency signals; and generate the transmission pulse signals by combining the N number of basic frequency signals while adjusting the phases of the basic frequency signals, wherein N is a positive integer.

When generating a composite signal by sampling the reflected pulse signals and combining the sampled reflected pulse signals to match the phases, the instructions cause the radar signal processing apparatus to: sample the reflected pulse signals; delay each phase of the sampled reflected pulse signals by a predetermined magnitude from a phase of an immediately preceding sampled reflected pulse signal; and generate the composite signal by combining the phase-delayed sampled reflected pulse signals.

When delaying each phase of the sampled reflected pulse signals by a predetermined magnitude from a phase of an immediately preceding sampled reflected pulse signal, the instructions cause the radar signal processing apparatus to: arrange samples of a first sampled reflected pulse signal on each sampling interval grid; and arrange samples of each following sampled reflected pulse signal on each sampling interval grid delayed by an amount of time the phase is advanced in generating the corresponding pulse signal.

According to the present disclosure, the radar signal processing apparatus may sequentially adjust the phase of each frequency component of the pulse signals constituting the transmission signal and transmit the same to the target. In addition, according to the present disclosure, the radar signal processing apparatus can transmit the pulse signals constituting the transmission signal as signals whose transmission timing is precisely adjusted through phase adjustment of each basic frequency component.

In addition, according to the present disclosure, the radar signal processing apparatus receives the pulse signals reflected from the target, samples them using a low-speed analog-to-digital converter (ADC), adjusts the phases so that the phases of the reflected pulse signals are matched, and combines them to generate a composite signal. As a result, according to the present disclosure, the radar signal processing apparatus can obtain the same or similar performance as that of acquiring the reception signal using a higher-performance ADC by combining the pulse signals into one reception signal.

BRIEF DESCRIPTION OF DRAWINGS

FIG. 3 is a flowchart illustrating a first exemplary embodiment of the process of generating the radar signal of FIG. 2.

FIG. 4 is a flowchart illustrating a first exemplary embodiment of the process of generating the plurality of pulse signals of FIG. 3.

FIG. 5 is a conceptual diagram illustrating a first exemplary embodiment of the process of generating the plurality of pulse signals of FIG. 3.

FIG. 7 is a conceptual diagram illustrating a first exemplary embodiment of the process of generating the composite signal of FIG. 2.

DETAILED DESCRIPTION OF THE EMBODIMENTS

Figure 1:
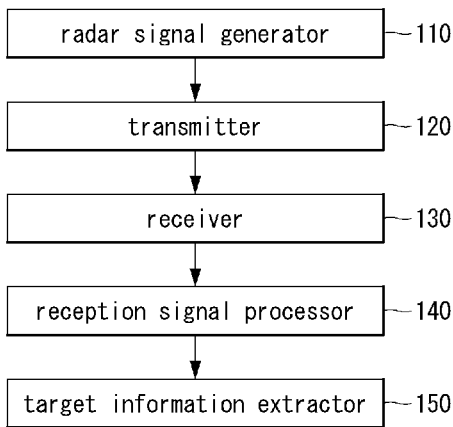
FIG. 1 is a block diagram illustrating a first exemplary embodiment of a radar signal processing apparatus.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A radar signal processing apparatus may be an apparatus for transmitting electromagnetic waves through a transmission antenna, receiving a reflection signal of electromagnetic waves scattered by a target through a reception antenna, and then performing a radar signal processing process to detect target information such as a distance to a target, a moving speed of a target, etc. As such a radar signal processing apparatus, a frequency modulated continuous wave (FMCW) radar, which is a pulse scheme radar, may be typically used to detect distance information of a target and speed information of a target. When using multiple array antennas and multiple-input and multiple-input (MIMO) technologies, not only distance information, but also azimuth and elevation information can be detected. Such a radar signal processing apparatus may not only transmit various types of electromagnetic wave signals according to the purpose of use, but may also be operated in accordance with each purpose of use by incorporating various technologies.

This radar signal processing apparatus may need to convert an analog electromagnetic wave signal into a digital signal so as to process a digital radar signal. To this end, the radar signal processing apparatus may include an analog-to-digital converter (ADC). The ADC may convert a reception signal of analog electromagnetic wave into a digital signal. In this case, the maximum frequency that the converted digital signal can have may be limited by the maximum sampling frequency of the ADC. The FMCW radar may require a radar signal bandwidth proportional to distance resolution improvement, but may have a scheme in which delay time information between a transmission radar signal and a reception radar signal is obtained and target distance information is extracted. The FMCW radar may have a scheme in which a transmission radar signal and a reception radar signal are mixed, and the frequency component of an intermediate frequency (IF)t is sampled with an ADC to convert the IF frequency into distance information. Thus, the FMCW radar may not require an ADC that covers a radar signal bandwidth. Therefore, the FMCW radar may fully detect the target distance information by using an ADC that covers the IF frequency band, which is the difference component between the transmission radar signal and the reception radar signal.

However, an orthogonal frequency division multiplexing (OFDM) radar, a phase modulated continuous wave (PMCW) radar, or an ultra-wideband (UWB) scheme radar is a radar system using I (in-phase)/Q (quadrature-phase) signals, and may require an ADC that covers a radar bandwidth. In the radar system, it may be important to secure distance resolution, and for this purpose, a high specification ADC may be required. In addition, some UWB scheme radars can be equipped with high-speed ADCs that exceed about tens of times the bandwidth to achieve precise millimeter range accuracy, Therefore, an object of the present disclosure is to provide a method and apparatus for exhibiting the same or similar performance to that as when using a high-speed ADC by using an ADC having a lower sampling rate in a radar system requiring such a high-speed ADC.

FIG. 1 is a block diagram illustrating a first exemplary embodiment of a radar signal processing apparatus.

Referring to FIG. 1, a radar signal processing apparatus may include a radar signal generator 110, a transmitter 120, a receiver 130, a reception signal processor 140, and a target information extractor 150. Here, the radar signal generator 110 may generate a radar signal composed of pulse signals of a number of any one sample rate having different phases. Here, the sampling rate may be a ratio of a theoretical ADC maximum sampling frequency and an actual ADC maximum sampling frequency. In addition, the transmitter 120 may transmit the pulse signals generated by the radar signal generator 110 to a target. The receiver 130 may receive the reflected pulse signals that are reflected back from the target by the pulse signals transmitted by the transmitter 120. In this case, each pulse signal transmitted from the transmitter 120 may be received by the receiver 130 after being delayed by the distance the target is away from the transmitter 120. Next, the reception signal processor 140 may generate a composite signal by sampling the reflected pulse signals using an analog-to-digital converter (ADC) and then combining the sampled reflected pulse signals while adjusting the phases to match the phases. The target information extractor 150 may extract target information from the composite signal generated by the reception signal processor 140. In this case, the target information may be a distance from the target or a moving speed of the target.

Figure 2:
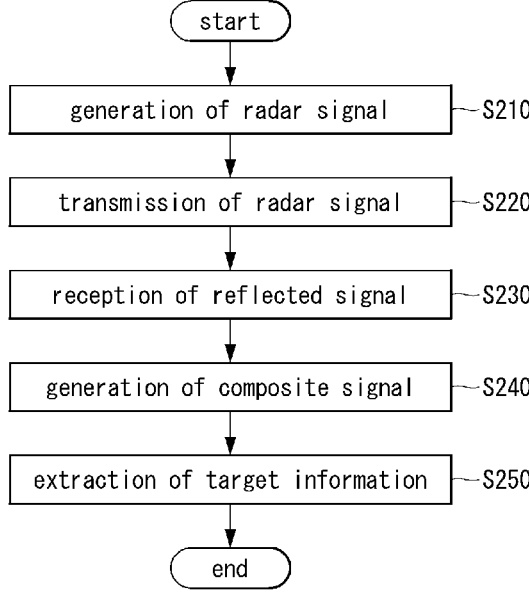
FIG. 2 is a flowchart illustrating a first exemplary embodiment of a radar signal processing method.

FIG. 2 is a flowchart illustrating a first exemplary embodiment of a radar signal processing method.

Referring to FIG. 2, in a radar signal processing method, a radar signal generator may generate a radar signal composed of pulse signals of a number of any one sampling rates having different phases (S210). Then, a transmitter may transmit the pulse signals (i.e., radar signal) generated by the radar signal generator to a target (S220). A receiver may receive the reflected pulse signals that are reflected back from the target by the pulse signals transmitted by the transmitter (S230). Next, a reception signal processor may generate a composite signal by sampling the reflected pulse signals using the ADC and then combining the sampled reflected pulse signals while adjusting the phases to match the phases (S240). A target information extractor may extract target information from the composite signal generated by the reception signal processor (S250). In this case, the target information may be a distance to the target or a moving speed of the target.

FIG. 3 is a flowchart illustrating a first exemplary embodiment of the process of generating the radar signal of FIG. 2.

Referring to FIG. 3, in the process of generating the radar signal, the radar signal generator may determine a theoretical ADC maximum sampling frequency, $f_{ADC\_max\_ideal}$, required to achieve a target performance (S301). In addition, the radar signal generator may determine actual ADC maximum sampling frequencies, $f_{ADC\_max\_real}$, that are the maximum sampling frequencies of the ADC to be actually used (S302). The theoretical ADC maximum sampling frequency can be more than twice the maximum frequency component of the radar signal. Here, the actual ADC maximum sampling frequency may be smaller than the theoretical ADC maximum sampling frequency as shown in Equation 1. The ratio between the theoretical ADC maximum sampling frequency and the actual ADC maximum sampling frequency may be defined as the sampling ratio (sr) as in Equation 2 below. Accordingly, the radar signal generator may calculate sampling rates (S303). Here, sr may be a real number.

$$f_{ADC\_max\_ideal} > f_{ADC\_max\_real} \qquad \text{[Equation 1]}$$

$$sr = f_{ADC\_max\_ideal} / f_{ADC\_max\_real} \qquad \text{[Equation 2]}$$

The laser signal generator may select any one sampling rate (SR) having a positive integer from the sampling rates (S304). That is, the laser signal generator selects the actual ADC maximum sampling frequencies to have ½, ⅓, ¼, etc. of the theoretical ADC maximum sampling frequency, and then selects any one actual ADC maximum sampling frequency, so that any one sampling rate (SR) having a positive integer may be selected.

Thereafter, the laser signal generator may generate a plurality of pulse signals of the selected sampling rate while having different phases (S305). In this case, the radar signal generator may advance the phase of a following pulse signal in the pulse signals by $t_s$/SR from a phase of an immediately preceding pulse signal. Here, $t_s$ may be a sampling interval of an actual ADC maximum sampling frequency, and may be determined by the following Equation 3.

$$t_s = 1/f_{ADC\_max\_real} \qquad \text{[Equation 3]}$$

A typical radar signal processing apparatus may calculate necessary information about a target using one pulse signal. However, the radar signal processing apparatus of the present disclosure may use a plurality of pulse signals to calculate necessary information about the target.

FIG. 4 is a flowchart illustrating a first exemplary embodiment of the process of generating the plurality of pulse signals of FIG. 3.

Referring to FIG. 4, in the process of generating the plurality of pulse signals, the laser signal generator may generate a first basic frequency signal to an N-th basic frequency signal (S401). Here, the frequency of the n-th basic frequency signal may be $f_n$. In this case, n may be less than or equal to N, and N may be a positive integer. In this case, the laser signal generator may generate pulse signals by adjusting the phases of the basic frequency signals (S402). In this case, the laser signal generator may adjust the phase, $\theta_{n,b}$, of each basic frequency signal constituting each pulse signal as shown in Equation 4 below. Here, the waveform of the basic frequency may be a sinusoidal wave or a cosine wave.

$$\theta_{n,b} = 2\pi \cdot f_n / (\Delta f \cdot N) \cdot (b-1) \qquad \text{[Equation 4]}$$

Here, n may be an index of each basic frequency signal, and $f_n$ may refer to a frequency of each basic frequency signal. b may be an index of each pulse signal in the same block, and B may be the total number of pulse signals in the same block. $\Delta f$ may refer to a frequency interval of each basic frequency signal. B may be SR.

Figure 5:
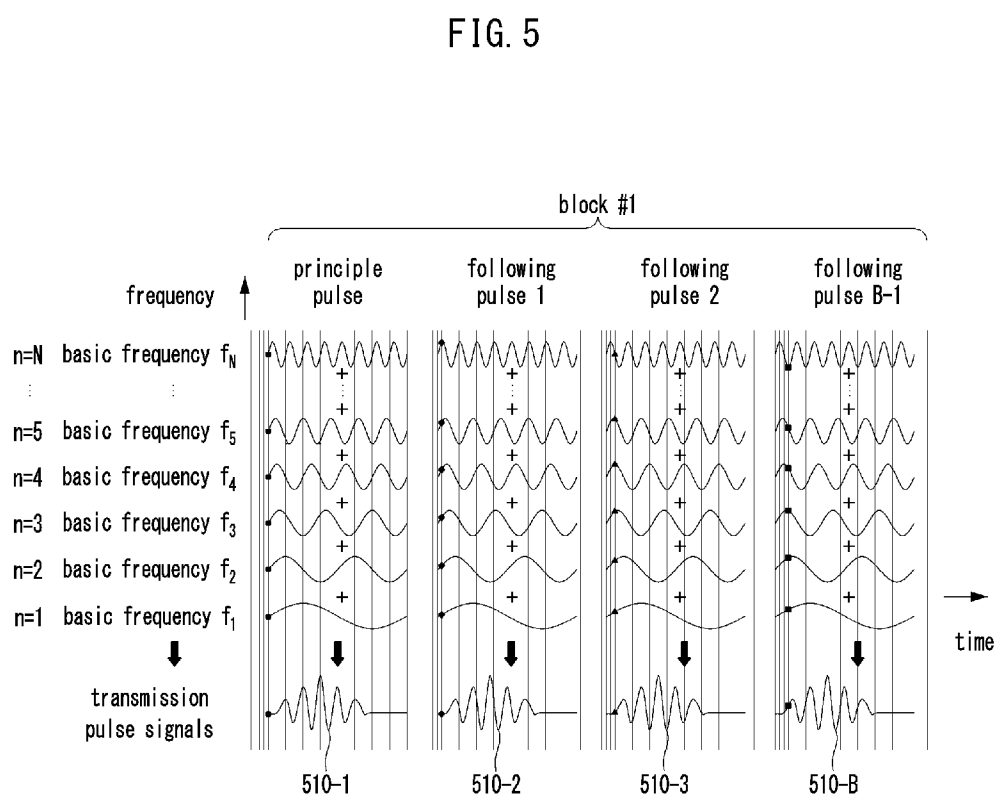

FIG. 5 is a conceptual diagram illustrating a first exemplary embodiment of the process of generating the plurality of pulse signals of FIG. 3.

Referring to FIG. 5, the number of pulse signals 510-1 to 510-B in a radar signal may be SR. Such SR number of pulse signals 510-1 to 510-B may be defined as one block (e.g., block #1) signal. The SR numg34 or pulse signals 510-1 to 510-B may be represented by a first pulse signal 510-1 to a B-th pulse signal 510-B. The b-th pulse signal 510-*b* may be expressed as Pb. In this case, b may be less than or equal to B, and B may be a positive integer. In addition, B may be the same as SR. Among the SR number of pulse signals, the first pulse signal may be a principal pulse signal, and the B−1 number of remaining pulse signals (i.e., the second pulse signal to the B-th pulse signal) may be the following pulses. The radar signal generator may generate the principle pulse signal and the following pulse signals to have the same waveform.

However, the radar signal generator may advance the phase of the following pulse signal in the pulse signals by $t_s$/SR from the phase of the immediately preceding pulse signal. Here, $t_s$ may be a sampling interval of an actual ADC maximum sampling frequency, and may be determined by the aforementioned Equation 3.

Meanwhile, the laser signal generator may generate each pulse signal by combining a first basic frequency signal to an N-th basic frequency signal. Here, the frequency of the n-th basic frequency signal may be expressed as $f_n$. In this case, n may be less than or equal to N, and N may be a positive integer. In this case, the laser signal generator may adjust the phase, $\theta_{n,b}$ of each basic frequency signal constituting each pulse signal as in Equation 4 above. In consideration of the specifications of a laser signal processing apparatus, the laser signal generator may determine the number N of basic frequency signals, determine the size of each basic frequency signal, and determine an interval between respective basic frequencies. Meanwhile, the waveform of the basic frequency is expressed as a trigonometric function waveform, but may not be limited thereto. The laser signal generator may generate a radio frequency transmission signal by converting the signals generated in a frequency domain into a time domain signal as described above.

Figure 6:
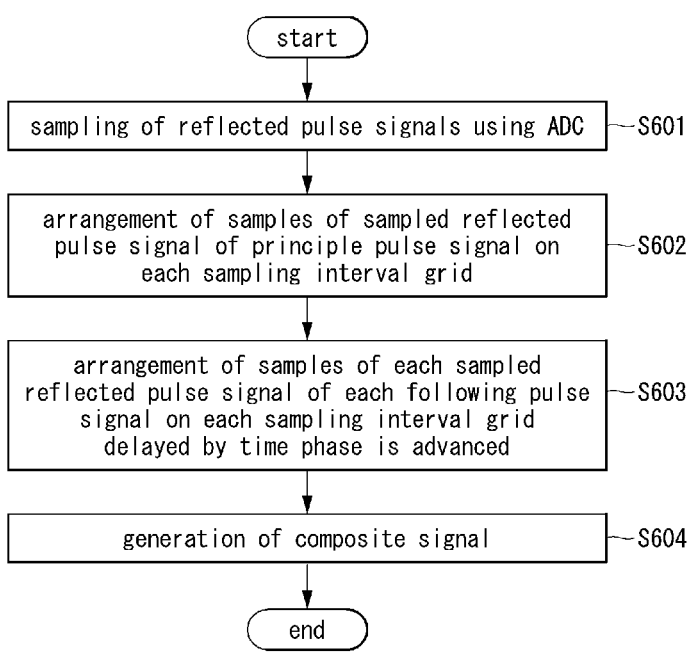
FIG. 6 is a flowchart illustrating a first exemplary embodiment of the process of generating the composite signal of FIG. 2.

FIG. 6 is a flowchart illustrating a first exemplary embodiment of the process of generating the composite signal of FIG. 2.

Referring to FIG. 6, in the process of generating the composite signal, the reception signal processor may sample the reflected pulse signals using the ADC (S601). In addition, the reception signal processor may arrange samples of the sampled reflected pulse signal of the principle pulse signal (i.e., the first reflected pulse signal) on each sampling interval grid (S602). Subsequently, the reception signal processor may arrange samples of each sampled reflected pulse signal of each following pulse signal (i.e., each of remaining reflected pulse signals) on each sampling interval grid delayed by the time the phase is advanced when generating the corresponding following pulse signal (S603). As a result, the reception signal processor may delay the phase of the sampled reflected pulse signal by $t_s$/SR from the phase of the immediately preceding sampled reflected pulse signal. Here, $t_s$ may be a sampling interval of an actual ADC maximum sampling frequency, and may be determined by the aforementioned Equation 3. In addition, the reception signal processor may generate a composite signal by combining the phase-delayed sampled reflected pulse signals. As such, the reception signal processor may adjust and combine the phases of the sampled reflected pulse signals to match the phases to generate a composite signal.

Figure 7:
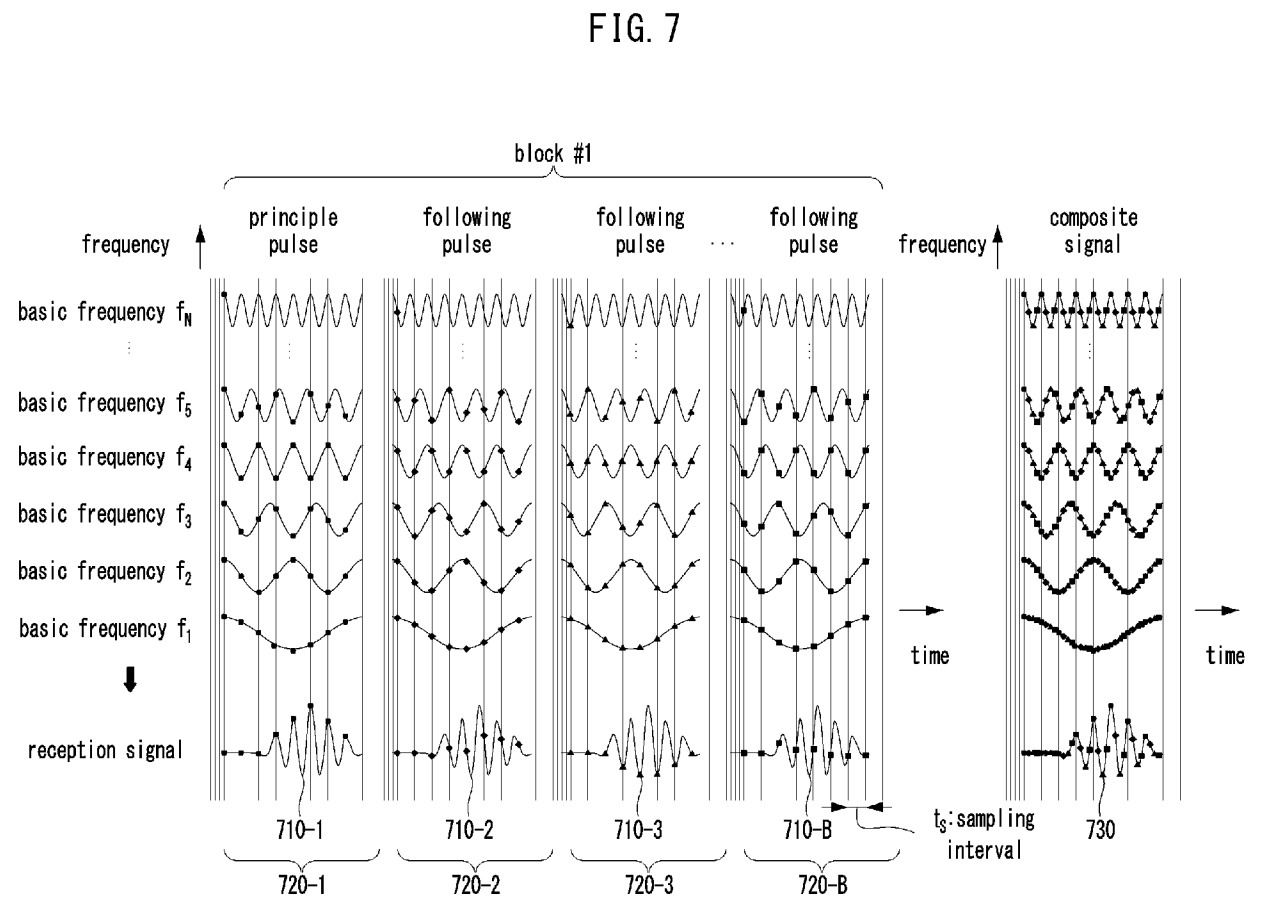

FIG. 7 is a conceptual diagram illustrating a first exemplary embodiment of the process of generating the composite signal of FIG. 2.

Referring to FIG. 7, in the process of generating a composite signal, the reception signal processor may sample the reflected pulse signals 710-1 to 710-B using an ADC. In addition, the reception signal processor may arrange the samples of the sampled reflected pulse signal of the principle pulse signal (that is, the first reflected pulse signal) 710-1 on each sampling interval grid 720-1. Subsequently, the reception signal processor may arrange the samples of each sampled reflected pulse signal of each following pulse signal (i.e., each of the remaining reflected pulse signals) 710-2 to 710-B on each sampling interval grid 720-2 to 720-B delayed by the time the phase is advanced when generating the corresponding following pulse signal. As a result, the reception signal processor may delay the phase of the sampled reflected pulse signal by $t_s/SR$ from the phase of the immediately preceding sampled reflected pulse signal. Here, $t_s$ may be a sampling interval of an actual ADC maximum sampling frequency, and may be determined by the aforementioned Equation 3. In addition, the reception signal processor may generate a composite signal 740 by combining the phase-delayed sampled reflected pulse signals. As such, the reception signal processor may adjust and combine the phases of the sampled reflected pulse signals to match the phases to generate a composite signal.

On the other hand, the following pulse signals in one block may be signals that are more precisely time advanced than the principle pulse signal in a time domain through phase adjustment of the basic frequency signal. Accordingly, when the reception signal processor arranges the following pulse signals on each delayed sampling interval grid by each advanced time, the reception signal sampled at an ideal ADC maximum sampling frequency may be generated.

On the other hand, some radar signal processing apparatuses may require a high-performance ADC. For example, an UWB radar may be equipped with a high-performance ADC for precise target distance measurement. In addition, a general OFDM radar or PMCW radar may require a wide bandwidth to achieve high-resolution range resolution, and may require an ADC as much as the bandwidth due to the characteristics of these radars. When it is difficult to use a high-performance ADC that covers a wide bandwidth, the radar signal processing apparatus may use a stepped-carrier OFDM scheme to cover a wide bandwidth with a low-speed ADC. Here, the step-carrier OFDM scheme radar uses a low-speed ADC to transmit signals having the same bandwidth but modulated in different bands. In addition, the step-carrier OFDM scheme radar may receive a signal using a low-speed ADC through different local oscillator (LO) modulation in each time domain. Thereafter, the step-carrier OFDM scheme radar may perform a radar signal processing by combining with the signal received by a high-speed ADC through the signal processing process. When using such a scheme, a rather complicated hardware structure may be required compared to the method proposed in the present disclosure. However, the method proposed in the present disclosure has the advantage of being able to transmit a pulse signal generated in the digital domain and combining with the reception digital signal in a simple way, and may be applicable to various types of waveforms such as pulse waveforms and OFDM waveforms.

Figure 8:
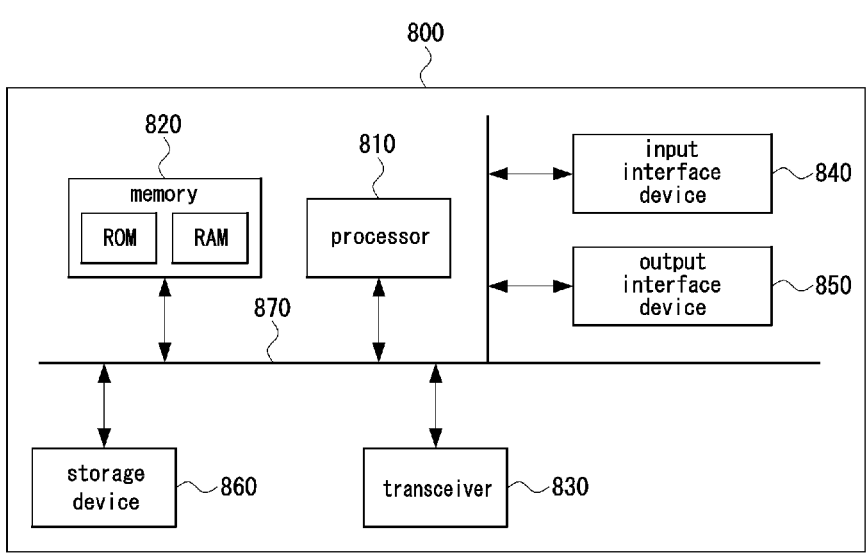
FIG. 8 is a block diagram illustrating a second exemplary embodiment of a radar signal processing apparatus.

FIG. 8 is a block diagram illustrating a second exemplary embodiment of a radar signal processing apparatus.

Referring to FIG. 8, a radar signal processing apparatus 800 may comprise at least one processor 810, a memory 820, and a transceiver 830. Also, the radar signal processing apparatus 800 may further comprise an input interface device 840, an output interface device 850, a storage device 860, and the like. The respective components included in the radar signal processing apparatus 800 may communicate with each other as connected through a bus 870.

However, each component included in the radar signal processing apparatus 800 may be connected to the processor 810 via an individual interface or a separate bus, rather than the common bus 870. For example, the processor 810 may be connected to at least one of the memory 820, the transceiver 830, the input interface device 840, the output interface device 850, and the storage device 860 via a dedicated interface.

The processor 810 may execute instructions stored in at least one of the memory 820 and the storage device 860. The processor 810 may refer to a central processing unit (CPU), a graphics processing unit (GPU), or a dedicated processor on which methods in accordance with embodiments of the present disclosure are performed. Each of the memory 820 and the storage device 860 may be constituted by at least one of a volatile storage medium and a non-volatile storage medium. For example, the memory 820 may comprise at least one of read-only memory (ROM) and random access memory (RAM). In such the configuration, the processor 810 may perform the operations of FIGS. 2 to 7 in cooperation with the transceiver 850.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operation method of a radar signal processing apparatus in a radar system, comprising the steps of:

generating N number of basic frequency signals;

generating pulse signals of a number of any one sampling rate having different phases by combining the N number of basic frequency signals;

transmitting the pulse signals to a target;

receiving reflected pulse signals reflected back from the target;

generating a composite receive signal by sampling reflected pulse signals and combining the sampled reflected pulse signals to match the phases; and extracting target information from the composite signal, wherein the any one sampling rate (SR) is selected from sampling rates (sr) of actual maximum sampling frequencies ($f_{ADC\_max\_real}$) to a theoretical maximum sampling frequency ($f_{ADC\_max\_ideal}$), the any one sampling rate is a positive integer, the theoretical maximum sampling frequency is greater than the actual maximum sampling frequencies, N is the positive integer, the any one sampling rate (SR) is one of the sampling rates (sr) and the sampling rate (sr) is defined as a ratio $f_{ADC\_max\_ideal}/f_{ADC\_max\_real}$.

2. The method according to claim 1, wherein the step of generating pulse signals of a number of any one sampling rate having different phases includes the steps of:

determining the theoretical maximum sampling frequency;

selecting the actual maximum sampling frequencies that are smaller than the theoretical maximum sampling frequency;

calculating the sampling rates that are ratios of the actual maximum sampling frequencies to the theoretical maximum sampling frequency;

selecting the any one sampling rate having a positive integer from the calculated sampling rates; and generating the transmission pulse signals of the number of the selected sampling rate to have the different phases.

3. The method according to claim 2, wherein the different phases are $t_s/SR$ where SR is the selected sampling rate, and $t_s$ is a sampling interval of an actual maximum sampling frequency of the selected sampling rate.

4. The method according to claim 1, wherein a phase, θn,b of each basic frequency signal constituting each transmission pulse signal is $2\pi \cdot fn/(\Delta f \cdot N) \cdot (b-1)$, where b is 1 to SR, n is an index of the basic frequency signal, fn is a frequency of the basic frequency signal, and b is an index of the transmit pulse signal, Δf is a frequency interval of the basic frequency signal, and the SR is the selected sampling rate.

5. The method according to claim 1, wherein the step of generating a composite signal by sampling the reflected pulse signals and combining the sampled reflected pulse signals to match the phases, includes the steps of:

sampling the reflected pulse signals;

delaying each phase of the sampled reflected pulse signals by a predetermined magnitude from a phase of an immediately preceding sampled reflected pulse signal; and generating the composite signal by combining the phase-delayed sampled reflected pulse signals.

6. The method according to claim 5, wherein the step of delaying each phase of the sampled reflected pulse signals by a predetermined magnitude from a phase of an immediately preceding sampled reflected pulse signal, includes the steps of:

arranging samples of a first sampled reflected pulse signal on each sampling interval grid; and arranging samples of each following sampled reflected pulse signal on each sampling interval grid delayed by an amount of time the phase is advanced in generating a corresponding pulse signal.

7. A radar signal processing apparatus, comprising:

a processor;

a memory in electronic communication with the processor; and instructions stored in the memory, wherein when the instructions are executed by the processor, the instructions cause the radar signal processing apparatus to:

generate N number of basic frequency signals;

generate pulse signals of a number of any one sampling rate having different phases by combining the N number of basic frequency signals;

transmit the pulse signals to a target;

receive reflected pulse signals reflected back from the target;

generate a composite signal by sampling the reflected pulse signals and combining the sampled reflected pulse signals to match the phases; and extract target information from the composite signal, wherein the any one sampling rate (SR) is selected from sampling rates (sr) of actual maximum sampling frequencies ($f_{ADC\_max\_real}$) to a theoretical maximum sampling frequency ($f_{ADC\_max\_ideal}$), the any one sampling rate is a positive integer, the theoretical maximum sampling frequency is greater than the actual maximum sampling frequencies, N is the positive integer, the any one sampling rate (SR) is one of the sampling rates (sr) and the sampling rate (sr) is defined as a ratio $f_{ADC\_max\_ideal}/f_{ADC\_max\_real}$.

8. The radar signal processing apparatus according to claim 7, wherein when generating pulse signals of a number of any one sampling rate having different phases, the instructions cause the radar signal processing apparatus to:

determine the theoretical maximum sampling frequency;

select the actual maximum sampling frequencies that are smaller than the theoretical maximum sampling frequency;

calculate the sampling rates that are ratios of the actual maximum sampling frequencies to the theoretical maximum sampling frequency;

select the any one sampling rate having a positive integer from the calculated sampling rates; and generate the transmission pulse signals of the number of the selected sampling rate to have the different phases.

9. The radar signal processing apparatus according to claim 7, wherein when generating a composite signal by sampling the reflected pulse signals and combining the sampled reflected pulse signals to match the phases, the instructions cause the radar signal processing apparatus to:

sample the reflected pulse signals;

delay each phase of the sampled reflected pulse signals by a predetermined magnitude from a phase of an immediately preceding sampled reflected pulse signal; and generate the composite signal by combining the phase-delayed sampled reflected pulse signals.

10. The radar signal processing apparatus according to claim 9, wherein when delaying each phase of the sampled reflected pulse signals by a predetermined magnitude from a phase of an immediately preceding sampled reflected pulse signal, the instructions cause the radar signal processing apparatus to:

arrange samples of a first sampled reflected pulse signal on each sampling interval grid; and arrange samples of each following sampled reflected pulse signal on each sampling interval grid delayed by an amount of time the phase is advanced in generating the corresponding pulse signal.

\* \* \* \* \*